(12) United States Patent
Luo et al.

(10) Patent No.: US 11,698,656 B2
(45) Date of Patent: Jul. 11, 2023

(54) FREQUENCY CHARACTERISTIC MEASUREMENT DEVICE, CONTROLLER AND FREQUENCY CHARACTERISTIC MEASUREMENT METHOD

(71) Applicant: FANUC CORPORATION, Yamanashi (JP)

(72) Inventors: Wei Luo, Yamanashi (JP); Tsutomu Nakamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 681 days.

(21) Appl. No.: 16/783,685

(22) Filed: Feb. 6, 2020

(65) Prior Publication Data

US 2020/0310485 A1  Oct. 1, 2020

(30) Foreign Application Priority Data

Mar. 29, 2019  (JP) .................. 2019-066353

(51) Int. Cl.
  *G06F 1/02*  (2006.01)
  *G01R 27/32*  (2006.01)
  (Continued)

(52) U.S. Cl.
  CPC ............. *G06F 1/022* (2013.01); *G01R 27/32* (2013.01); *G05B 19/371* (2013.01);
  (Continued)

(58) Field of Classification Search
  CPC ......... G06F 1/022; G01R 23/02; G01R 27/30; G01R 27/32; G05B 19/371; G05B 19/408;
  (Continued)

(56) References Cited

U.S. PATENT DOCUMENTS

2013/0271155 A1  10/2013  O'Keeffe et al.
2015/0241869 A1*  8/2015  Tezuka .................. G05B 19/408
                                                  700/73

FOREIGN PATENT DOCUMENTS

JP          60-71967    4/1985
JP          8-94690     4/1996
            (Continued)

*Primary Examiner* — John E Breene
*Assistant Examiner* — Dacthang P Ngo
(74) *Attorney, Agent, or Firm* — Wenderoth, Lind & Ponack, L.L.P.

(57) ABSTRACT

A frequency characteristic measurement device that measures the frequency characteristic of a measurement target includes: a multi-sine signal generation unit that generates a multi-sine signal; a sweep sinusoidal wave generation unit that generates a plurality of sweep sinusoidal waves; an input signal switching unit that selects any one of the multi-sine signal and the sweep sinusoidal waves so as to input the selected one to the measurement target; a data acquisition unit that acquires, at a predetermined sampling frequency, sampling data of an input signal which is input to the measurement target and sampling data of an output signal which is output from the measurement target; and a characteristic calculation unit that calculates a frequency characteristic including the gain and the phase of the input and output signals in the measurement target from the sampling data of the input and output acquired.

7 Claims, 8 Drawing Sheets

(51) Int. Cl.
*G05B 19/408* (2006.01)
*G05B 19/37* (2006.01)
(52) U.S. Cl.
CPC .. *G05B 19/408* (2013.01); *G05B 2219/37181* (2013.01); *G05B 2219/37352* (2013.01); *G06F 2101/04* (2013.01)
(58) Field of Classification Search
CPC .......... G05B 2219/37181; G05B 2219/37352; G05B 2219/37534; G05B 2219/37612
USPC ................................... 702/75, 66
See application file for complete search history.

(56) References Cited

FOREIGN PATENT DOCUMENTS

| | | |
|---|---|---|
| JP | 10-142273 | 5/1998 |
| JP | 2015-158734 | 9/2015 |

\* cited by examiner

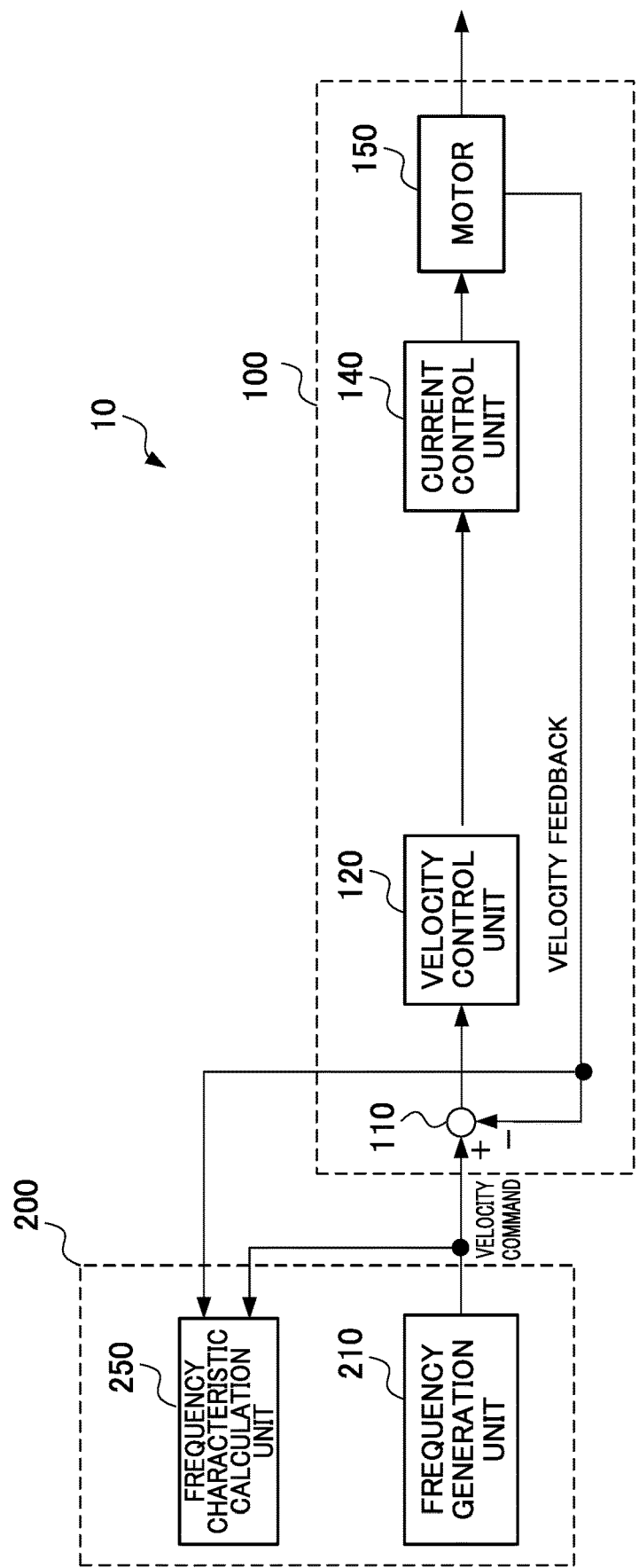

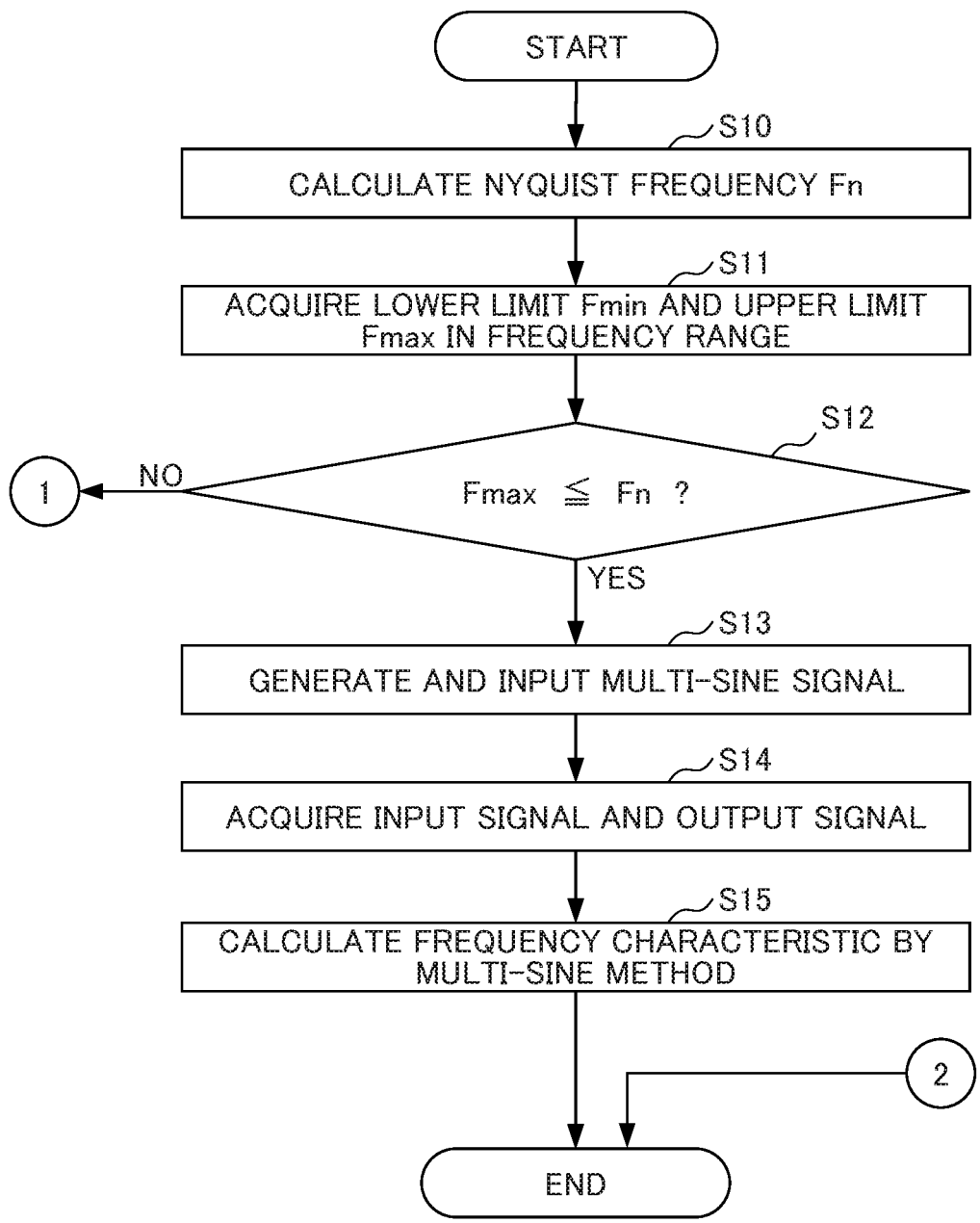

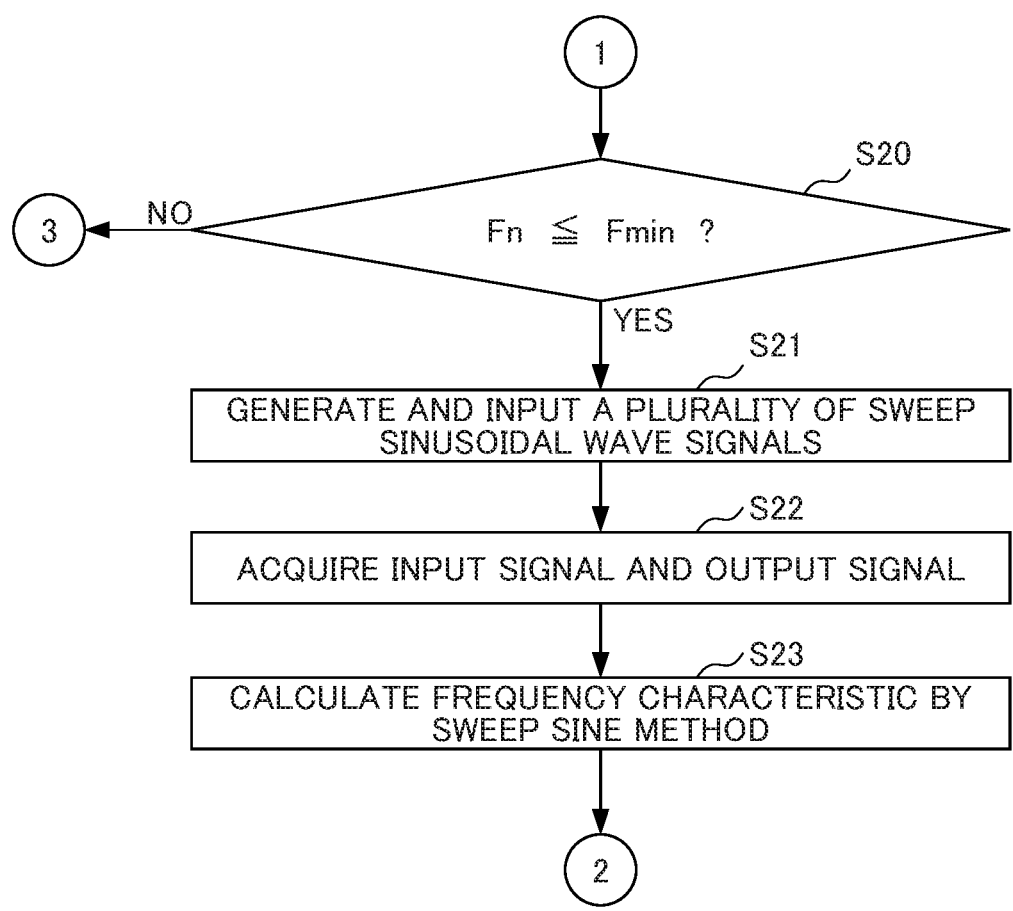

FREQUENCY CHARACTERISTIC MEASUREMENT DEVICE, CONTROLLER AND FREQUENCY CHARACTERISTIC MEASUREMENT METHOD

This application is based on and claims the benefit of priority from Japanese Patent Application No. 2019-066353, filed on 29 Mar. 2019, the content of which is incorporated herein by reference.

BACKGROUND OF THE INVENTION

Field of the Invention

The present invention relates to a frequency characteristic measurement device, a controller and a frequency characteristic measurement method.

Related Art

Conventionally, a numerical controller is known which numerically controls a machine tool that machines a workpiece. A machine tool performs, for example, turning, planing, drilling, milling and grinding on a workpiece, and often incorporates a motor. In a machine tool using a motor, for the purpose of the analysis of mechanical vibration that causes deterioration of operating characteristics, the responsiveness of control or the analysis of stability, the frequency characteristic (frequency response characteristic) of the motor to which a load is connected is measured. When the frequency characteristic of the motor is measured, for example, a sinusoidal velocity command is input to a numerical controller for the motor to which the load is connected while the frequency is gradually increased (which is also referred to as "sinusoidal sweep"). In this way, a motor velocity value obtained from a velocity detector for the motor is compared with the velocity command value, an amplitude ratio and a phase difference are analyzed and the result of the analysis is displayed as a Bode diagram.

However, when the frequency characteristic of a velocity feedback loop is calculated from a relationship between an input and an output obtained by inputting the sinusoidal velocity command to the velocity feedback loop of the numerical controller while the frequency is gradually increased, since a measurement needs to be performed while the frequency is gradually increased in a measurement band, a measurement time is disadvantageously long.

On the other hand, a technology is disclosed in patent document 1 in which a wideband signal such as a multi-sine wave formed with the sinusoidal waves of a plurality of frequencies is generated from a signal source for a system to be measured such that a transfer function is determined with a fast Fourier transform circuit, in which frequency measurement points for a sinusoidal sweep measurement are determined such that the measurement is performed with a high resolution in a region where a large variation in the transfer function is produced whereas the measurement is performed with a low resolution in a region where a small variation in the transfer function is produced and in which the measurement using the sinusoidal sweep is performed according to the above description so as to reduce the measurement time. More specifically, it is disclosed that coarse sweep is performed within a frequency range in a predetermined range by utilization of the multi-sine wave, that based on the sweep, a frequency region on which a thorough search is performed is identified and that the sweep is performed with a high-resolution sinusoidal wave in an area of the frequency region where a large variation in transfer characteristic is produced whereas the sweep is performed with a low-resolution sinusoidal wave in the other areas. However, even in the area where a large variation in transfer characteristic is produced, depending on the band of the measurement frequency, a sampling frequency $F_s$ is not sufficient, and when a frequency signal greater than a Nyquist frequency $F_n$ (frequency of half the sampling frequency $F_s$) is measured, aliasing occurs, with the result that the signal waveform may completely differ from the original signal. Hence, it is necessary to restrict, with a filter, a signal which is input to a measuring device to the Nyquist frequency $F_n$ even in the area where a large variation in transfer characteristic is produced.

On the other hand, patent document 2 discloses that when the frequency of an input signal is lower than, for example, the Nyquist frequency $F_n$, the sinusoidal signal of an initial phase is input to a control loop only once without being shifted, and thus the frequency characteristic is calculated, and that when the frequency of the input signal is higher than, for example, the Nyquist frequency $F_n$, a sinusoidal signal obtained by shifting from the initial phase only a fixed amount is input to the control loop k times, and thus the frequency characteristic is calculated. However, in the measurement method disclosed in patent document 2, as in the conventional technology, it is necessary to perform a measurement while the frequency is gradually increased in a measurement band, with the result that a measurement time is still disadvantageously long.

Patent Document 1: Japanese Unexamined Patent Application, Publication No. H08-94690

Patent Document 2: Japanese Unexamined Patent Application, Publication No. 2015-158734

SUMMARY OF THE INVENTION

In a frequency characteristic measurement device which supplies a sinusoidal signal to a measurement target so as to measure the frequency characteristic of the measurement target, when the frequency characteristic (frequency response characteristic) of a control signal (input signal) for the measurement target is measured, it is desired to provide high measurement accuracy and to reduce a measurement time.

(1) One aspect of the frequency characteristic measurement device of the present disclosure is a frequency characteristic measurement device that supplies a sinusoidal signal to a measurement target so as to measure the frequency characteristic of the measurement target, and includes: a multi-sine signal generation unit that generates a multi-sine signal formed with sinusoidal waves of a plurality of frequencies; a sweep sinusoidal wave generation unit that generates a sweep sinusoidal wave while increasing a frequency and that generates a plurality of sweep sinusoidal waves formed with a sweep sinusoidal wave in which a predetermined phase is set to an initial phase and a sweep sinusoidal wave which is obtained by shifting the initial phase only a fixed amount; an input signal switching unit that selects any one of the multi-sine signal generated with the multi-sine signal generation unit and the sweep sinusoidal waves generated with the sweep sinusoidal wave generation unit so as to input the selected one to the measurement target; a data acquisition unit that acquires, at a predetermined sampling frequency, sampling data of an input signal which is input to the measurement target and sampling data of an output signal which is output from the measurement target; and a characteristic calculation unit that calculates a frequency characteristic including the gain and the phase of the input and output signals in the measurement target from the sampling data of the input signal and the sampling data of the output signal acquired with the data acquisition unit.

(2) One aspect of the frequency characteristic measurement device of the present disclosure is the frequency characteristic measurement device of (1), and includes: a Nyquist frequency calculation unit that calculates a Nyquist frequency from the sampling frequency; and a frequency band acquisition unit that acquires a lower limit frequency and an upper limit frequency in a frequency band of the measurement target whose frequency characteristic is calculated with the characteristic calculation unit, when the Nyquist frequency is equal to or greater than the upper limit frequency, the input signal switching unit inputs, to the measurement target, a multi-sine signal generated with the multi-sine signal generation unit and formed with sinusoidal waves of a plurality of frequencies from the lower limit frequency to the upper limit frequency, when the Nyquist frequency is equal to or less than the lower limit frequency, the input signal switching unit inputs, to the measurement target, a plurality of sweep sinusoidal waves generated with the sweep sinusoidal wave generation unit and formed with a sweep sinusoidal wave in which the predetermined phase is set to the initial phase and which is generated while the frequency is being increased from the lower limit frequency to the upper limit frequency and the sweep sinusoidal wave which is obtained by shifting the initial phase only the fixed amount and when the Nyquist frequency is greater than the lower limit frequency and is less than the upper limit frequency, the input signal switching unit inputs, to the measurement target, a multi-sine signal generated with the multi-sine signal generation unit and formed with sinusoidal waves of a plurality of frequencies from the lower limit frequency to the Nyquist frequency and the input signal switching unit inputs, to the measurement target, a plurality of sweep sinusoidal waves generated with the sweep sinusoidal wave generation unit and formed with a sweep sinusoidal wave in which the predetermined phase is set to the initial phase and which is generated while the frequency is being increased from the Nyquist frequency to the upper limit frequency and the sweep sinusoidal wave which is obtained by shifting the initial phase only the fixed amount.

(3) In one aspect of the controller of the present disclosure, the measurement target is a control loop that controls at least one control target in the controller, and the frequency characteristic measurement device of (1) or (2) is included.

(4) One aspect of the frequency characteristic measurement method of the present disclosure is a frequency characteristic measurement method that supplies a sinusoidal signal to a measurement target so as to measure the frequency characteristic of the measurement target, the frequency characteristic measurement method includes: a multi-sine signal generation step of generating a multi-sine signal formed with sinusoidal waves of a plurality of frequencies; a sweep sinusoidal wave generation step of generating a sweep sinusoidal wave while increasing a frequency and of generating a plurality of sweep sinusoidal waves formed with a sweep sinusoidal wave in which a predetermined phase is set to an initial phase and a sweep sinusoidal wave which is obtained by shifting the initial phase only a fixed amount; an input signal switching step of selecting any one of the multi-sine signal generated in the multi-sine signal generation step and the sweep sinusoidal waves generated in the sweep sinusoidal wave generation step so as to input the selected one to the measurement target; a data acquisition step of acquiring, at a predetermined sampling frequency, sampling data of an input signal which is input to the measurement target and sampling data of an output signal which is output from the measurement target; and a characteristic calculation step of calculating a frequency characteristic including the gain and the phase of the input and output signals in the measurement target from the sampling data of the input signal and the sampling data of the output signal acquired in the data acquisition step and the multi-sine signal generation step, the sweep sinusoidal wave generation step, the input signal switching step, the data acquisition step and the characteristic calculation step are performed with a computer.

According to one aspect, in a frequency characteristic measurement device which measures the frequency characteristic of a measurement target, when the frequency characteristic (frequency response characteristic) of a control signal (input signal) for the measurement target is measured, it is possible to provide high measurement accuracy and to reduce a measurement time regardless of the value in a frequency band which is measured.

BRIEF DESCRIPTION OF THE DRAWINGS

FIG. 1A is a diagram showing an example of the configuration of a controller according to an embodiment;

FIG. 5A is a flowchart illustrating a measurement operation of a frequency characteristic measurement unit;

FIG. 5B is a flowchart illustrating the measurement operation of the frequency characteristic measurement unit;

DETAILED DESCRIPTION OF THE INVENTION

An embodiment will be described below with reference to drawings. In the present embodiment, as a measurement target, a motor to which a load is connected in a controller is used as an example, and a case where the frequency characteristic (frequency response characteristic) of a control signal (velocity command value signal) is measured will be illustrated. The frequency measurement target of a frequency characteristic measurement device is not limited to this example. An arbitrary control target is used as the measurement target, and thus the frequency characteristic (frequency response characteristic) of an input signal can be measured.

Configuration of Embodiment

Figure 1B:
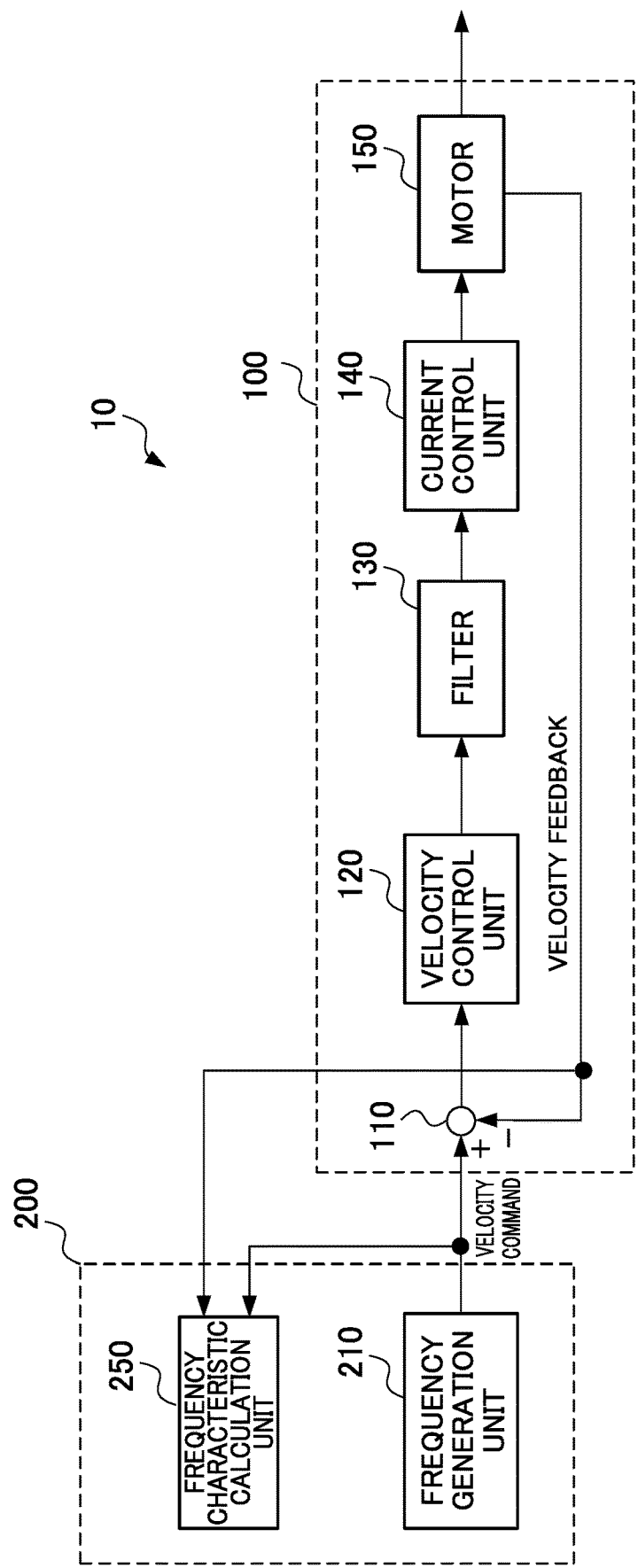
FIG. 1B is a diagram showing the example of the configuration of the controller according to the embodiment.

FIGS. 1A and 1B are diagrams showing an example of the configuration of the controller according to the present embodiment. Examples of the control target of the controller 10 include a machine tool, a robot and an industrial machine. The controller 10 may be provided as part of the control target of a machine tool, a robot, an industrial machine or the like.

With reference to FIG. 1A, the controller 10 includes a servo control unit 100 which serves as a servo controller and a frequency characteristic measurement unit 200 which serves as a frequency characteristic measurement device.

The servo control unit 100 includes a subtractor 110, a velocity control unit 120, a current control unit 140 and a servo motor 150 serving as the control target. The subtractor 110, the velocity control unit 120, the current control unit 140 and the servo motor 150 form a velocity feedback loop as a control loop. Although the servo motor 150 serving as a motor will be described as a motor which performs a rotational movement in the following discussion, the servo motor 150 may be a linear motor which performs a linear movement.

The subtractor 110 calculates a difference between the velocity command value and the feedback velocity detection value, and outputs the difference as a velocity error to the velocity control unit 120.

The velocity control unit 120 adds a value obtained by multiplying the velocity error by an integral gain K1v and integrating the result and a value obtained by multiplying the velocity error by a proportional gain K2v, and outputs the resulting value as a torque command to the current control unit 140.

The current control unit 140 generates, based on the torque command, a current command for driving the servo motor 150, and outputs the current command to the servo motor 150. The rotational angular position of the servo motor 150 is detected with a rotary encoder (not shown) provided in the servo motor 150, and the velocity detection value is input as the velocity feedback to the subtractor 110.

As shown in FIG. 1B, a filter 130 may be provided between the velocity control unit 120 and the current control unit 140. In this way, when a local maximum point (resonance point) is present in the gain characteristic of the frequency characteristic, it is possible to adjust, according to the frequency thereof, a parameter for the transfer function of the filter 130.

<Frequency Characteristic Measurement Unit 200>

The frequency characteristic measurement unit 200 serving as the frequency characteristic measurement device includes a frequency generation unit 210 and a frequency characteristic calculation unit 250. Specifically, the frequency characteristic measurement unit 200 uses the velocity command value signal which is generated with the frequency generation unit 210 and which serves as the input signal and the velocity detection value which serves as an output signal output from, for example, the rotary encoder (not shown), and thereby determines, with the frequency characteristic calculation unit 250, an amplitude ratio (input/output gain) between the input signal and the output signal and a phase delay for each frequency specified with the velocity command.

<Frequency Generation Unit 210>

Figure 2:
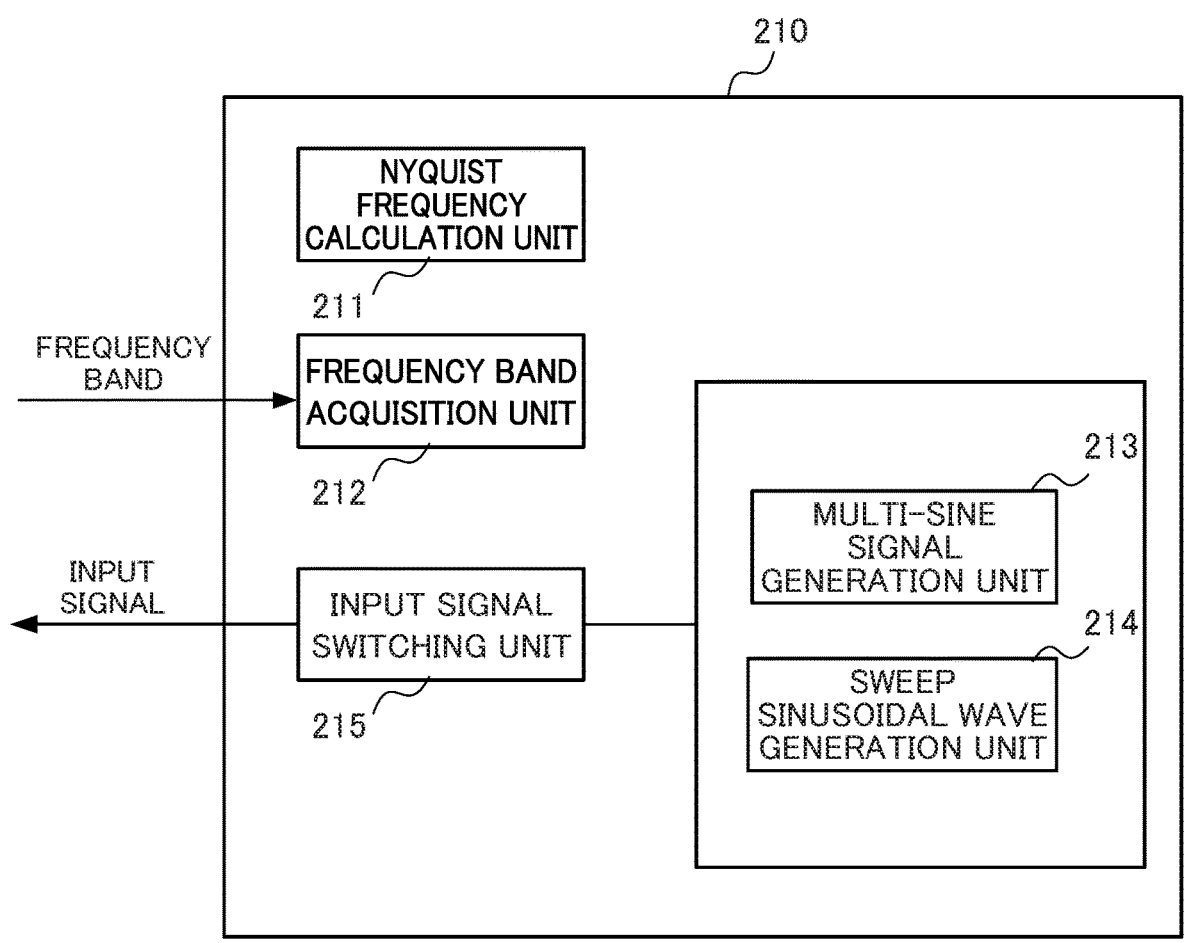
FIG. 2 is a functional block diagram showing a functional configuration example of a frequency generation unit shown in FIGS. 1A and 1B.

FIG. 2 is a functional block diagram showing a functional configuration example of the frequency generation unit 210. As shown in FIG. 2, the frequency generation unit 210 includes a Nyquist frequency calculation unit 211, a frequency band acquisition unit 212, a multi-sine signal generation unit 213, a sweep sinusoidal wave generation unit 214 and an input signal switching unit 215.

<Nyquist Frequency Calculation Unit 211>

The Nyquist frequency calculation unit 211 acquires a sampling frequency $F_s$ for sampling (sampling) the input signal and the output signal in the frequency characteristic measurement unit 200 so as to calculate a Nyquist frequency $F_n$. Here, the Nyquist frequency $F_n$ is a frequency of half the sampling frequency $F_s$. When the sampling frequency $F_s$ is not sufficient, for example, when a signal of a frequency greater than the Nyquist frequency $F_n$ is sampled, an aliasing phenomenon occurs in which sample points do not sufficiently follow a waveform such that the curve of a series of sample points completely differs from the original signal waveform. Hence, as will be described later, the frequency generation unit 210 switches outgoing signals according to the sampling frequency $F_s$.

<Frequency Band Acquisition Unit 212>

In order to calculate the frequency characteristic for each frequency specified with the velocity command, the frequency band acquisition unit 212 acquires the setting values of a lower limit frequency $F_{min}$ and an upper limit frequency $F_{max}$ in a frequency range (frequency band) of the measurement target which are previously specified by the user of the frequency characteristic measurement unit 200.

<Multi-Sine Signal Generation Unit 213>

The multi-sine signal generation unit 213 generates a multi-sine signal formed with the sinusoidal waves of a plurality of frequencies included in a predetermined frequency range. For example, the multi-sine signal generation unit 213 may include sinusoidal wave generators in which the amplitudes of output signals are the same as each other and in which frequencies are different from each other so as to combine the output frequencies of the sinusoidal wave generators. The multi-sine wave is preferably a multiple sine wave in which sinusoidal waves are equal at all resolution points.

<Sweep Sinusoidal Wave Generation Unit 214>

The sweep sinusoidal wave generation unit 214 generates sweep sinusoidal waves included in the predetermined frequency range while increasing the frequency. Specifically, the sweep sinusoidal wave generation unit 214 can generate a plurality of sweep sinusoidal waves formed with a sweep sinusoidal wave in which a predetermined phase is set to an initial phase and a sweep sinusoidal wave which is obtained by shifting the initial phase only a fixed amount. The sweep sinusoidal wave generation unit 214 may further generate n sweep sinusoidal waves obtained by shifting the initial phase by $2\pi/n$. The sweep sinusoidal wave generation unit 214 may also generate a sweep sinusoidal wave obtained by shifting the initial phase by $2\pi/3$ and a sweep sinusoidal wave obtained by shifting the initial phase by $-2\pi/3$. When the input signal includes a frequency component whose frequency is equal to or greater than the Nyquist frequency $F_n$, it is impossible to perform sampling at two or more points per period. In such a case, a sinusoidal signal which is generated with the sweep sinusoidal wave generation unit 214 and which is obtained by shifting from the initial phase only the fixed amount is input to the velocity feedback loop a plurality of times (n times: n≥2), and thus it is possible to perform sampling at least n points per period. Here, n is preferably equal to or greater than 3.

<Input Signal Switching Unit 215>

The input signal switching unit 215 selects any one of the multi-sine signal generated with the multi-sine signal generation unit 213 and the sweep sinusoidal waves generated with the sweep sinusoidal wave generation unit 214, and inputs it to the velocity feedback loop of the servo motor. When the Nyquist frequency $F_n$ is equal to or greater than the upper limit frequency $F_{max}$, the input signal switching unit 215 inputs, to the velocity feedback loop, a multi-sine signal which is generated with the multi-sine signal generation unit 213 and which is formed with the sinusoidal waves of a plurality of frequencies from the lower limit frequency $F_{min}$ to the upper limit frequency $F_{max}$. When the Nyquist frequency $F_n$ is equal to or less than the lower limit frequency $F_{min}$, the input signal switching unit 215 inputs, to the velocity feedback loop, a plurality of sweep sinusoidal waves that are generated with the sweep sinusoidal wave generation unit 214 and that are formed with a sweep sinusoidal wave in which the predetermined phase is set to the initial phase and which is generated while the frequency is being increased from the lower limit frequency $F_{min}$ to the upper limit frequency $F_{max}$ and the sweep sinusoidal wave which is obtained by shifting the initial phase only the fixed amount. When the Nyquist frequency $F_n$ is greater than the lower limit frequency $F_{min}$ and is less than the upper limit frequency $F_{max}$, the input signal switching unit 215 inputs, to the velocity feedback loop, a multi-sine signal which is generated with the multi-sine signal generation unit 213 and which is formed with the sinusoidal waves of a plurality of frequencies from the lower limit frequency $F_{min}$ to the Nyquist frequency $F_n$. Then, the input signal switching unit 215 inputs, to the velocity feedback loop, a plurality of sweep sinusoidal waves that are generated with the sweep sinusoidal wave generation unit 214 and that are formed with a sweep sinusoidal wave in which the predetermined phase is set to the initial phase and which is generated while the frequency is being increased from the Nyquist frequency $F_n$ to the upper limit frequency $F_{max}$ and the sweep sinusoidal wave which is obtained by shifting the initial phase only the fixed amount. As described above, when the frequency characteristic is measured, the input of the multi-sine signal which makes it possible to measure the frequency characteristic in, for example, a low frequency band for a short period of time and the input of the sweep sinusoidal wave a plurality of times in, for example, a high frequency band are used together and thus it is possible to reduce a measurement time and to perform a highly accurate measurement. The input signal which is input to the velocity feedback loop of the servo control unit 100 and which serves as the velocity command has been described above.

<Frequency Characteristic Calculation Unit 250>

Figure 3:
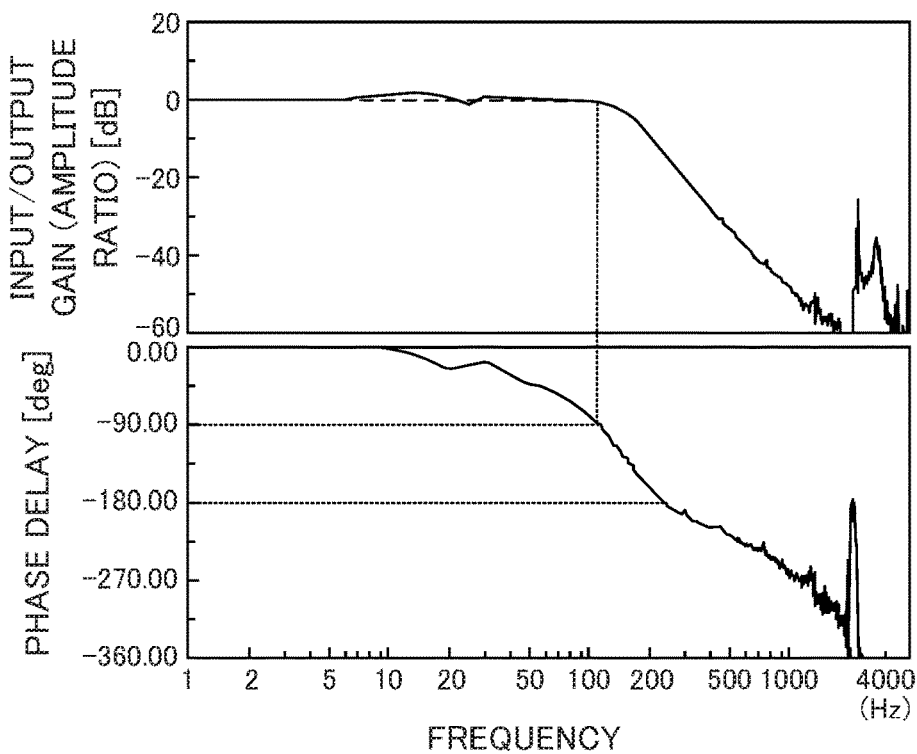
FIG. 3 is a diagram showing an example of a frequency characteristic of an amplitude ratio between an input signal and an output signal and a phase delay.

The frequency characteristic calculation unit 250 uses the velocity command value signal which is generated in the frequency generation unit 210 and which serves as the input signal and the velocity detection value which serves as the output signal output from, for example, the rotary encoder (not shown), and thereby determines the amplitude ratio (input/output gain) between the input signal and the output signal and the phase delay for each frequency specified with the velocity command. FIG. 3 is a Bode diagram showing the frequency characteristic of the amplitude ratio between the input signal and the output signal and the phase delay. The frequency characteristic calculation unit 250 calculates the frequency characteristic on the input/output gain (amplitude ratio) and the phase delay as shown in FIG. 3. Specifically, the frequency characteristic calculation unit 250 calculates the frequency characteristic on the input/output gain (amplitude ratio) and the phase delay in the frequency range (frequency band where the lower limit frequency $F_{min}$ and the upper limit frequency $F_{max}$ are set) of the measurement target which is specified by the user of the frequency characteristic measurement unit 200. Here, the frequency characteristic calculation unit 250 may display the calculated frequency characteristic on a display (not shown).

Figure 4:
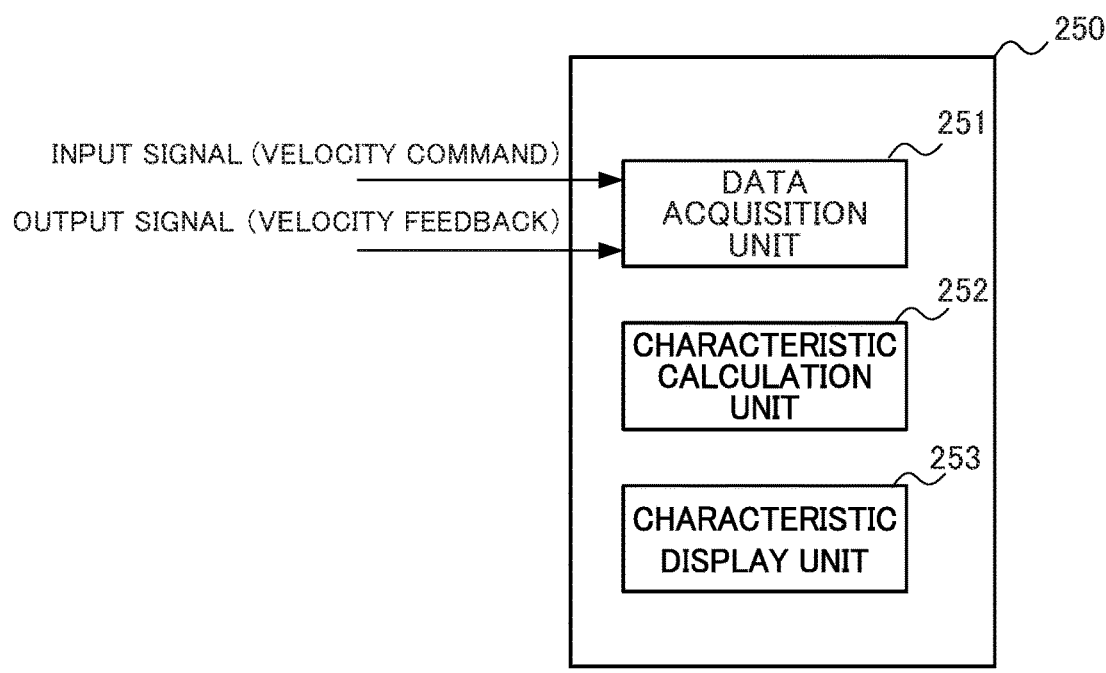
FIG. 4 is a functional block diagram showing a functional configuration example of a frequency characteristic calculation unit shown in FIGS. 1A and 1B.

FIG. 4 is a functional block diagram showing a functional configuration example of the frequency characteristic calculation unit 250. As shown in FIG. 4, the frequency characteristic calculation unit 250 includes a data acquisition unit 251, a characteristic calculation unit 252 and a characteristic display unit 253.

<Data Acquisition Unit 251>

As shown in FIG. 1, the data acquisition unit 251 acquires, at the sampling frequency $F_s$, the sampling data of the input signal which is input to the velocity feedback loop and the sampling data of the output signal which is output from the velocity feedback loop.

<Characteristic Calculation Unit 252>

The characteristic calculation unit 252 calculates, from the sampling data of the input signal and the sampling data of the output signal acquired with the data acquisition unit 251, a frequency characteristic including the gain and the phase of the input and output signals of the velocity feedback loop. Specifically, when the frequency of the measurement target is equal to or less than the Nyquist frequency $F_n$, the characteristic calculation unit 252 calculates, by a known multi-sine method, the frequency characteristic including the gain and the phase of the input and output signals of the velocity feedback loop according to the fact that the input signal is the multi-sine signal. When the frequency of the measurement target is equal to or greater than the Nyquist frequency $F_n$, the characteristic calculation unit 252 calculates, by a known sweep sign method, the frequency characteristic including the gain and the phase of the input and output signals of the velocity feedback loop according to the fact that the input signal is a plurality of sweep sinusoidal waves. Specifically, when the Nyquist frequency $F_n$ is equal to or greater than the upper limit frequency $F_{max}$, the characteristic calculation unit 252 inputs, to the velocity feedback loop, the multi-sine signal generated with the multi-sine signal generation unit 213 and formed with the sinusoidal waves of a plurality of frequencies from the lower limit frequency $F_{min}$ to the upper limit frequency $F_{max}$, stores the corresponding output signal in, for example, a data storage unit (not shown) and performs Fourier transform processing on the data thereof, with the result that the frequency characteristic of the output signal may be calculated. When the Nyquist frequency $F_n$ is equal to or less than the lower limit frequency $F_{min}$, the characteristic calculation unit 252 inputs, to the velocity feedback loop, a plurality of sweep sinusoidal waves generated with the sweep sinusoidal wave generation unit 214, and compares the output signal thereof with the input signal, with the result that the frequency characteristic including the gain and the phase may be calculated. When the Nyquist frequency $F_n$ is greater than the lower limit frequency $F_{min}$ and is less than the upper limit frequency $F_{max}$, the characteristic calculation unit 252 inputs, to the velocity feedback loop, the multi-sine signal generated with the multi-sine signal generation unit 213 and formed with the sinusoidal waves of a plurality of frequencies from the lower limit frequency $F_{min}$ to the upper limit frequency $F_{max}$, stores the corresponding output signal in, for example, the data storage unit (not shown) and performs the Fourier transform processing on the data thereof, with the result that the frequency characteristic of the output signal may be calculated. Then, the characteristic calculation unit 252 inputs, to the velocity feedback loop, a plurality of sweep sinusoidal waves formed with a sweep sinusoidal wave which is generated with the sweep sinusoidal wave generation unit 214 while the frequency is being increased from the Nyquist frequency $F_n$ to the upper limit frequency $F_{max}$ and the sweep sinusoidal wave which is obtained by shifting the initial phase only the fixed amount, and compares the output signal thereof with the input signal, with the result that the frequency characteristic including the gain and the phase may be calculated. The characteristic calculation unit 252 may combine both thereof so as to calculate the frequency characteristic in the frequency range of the measurement target.

<Characteristic Display Unit 253>

The characteristic display unit 253 displays, on the display (not shown), the frequency characteristic calculated with the characteristic calculation unit 252 and including the gain and the phase of the input and output signals of the velocity feedback loop by the format of, for example, a Bode diagram.

By using, as an example, the case where the frequency characteristic (frequency response characteristic) of the motor to which the load is connected is measured, the functional configuration of the controller 10 according to the present embodiment has been described in which in order for the frequency characteristic to be calculated for each frequency specified with the velocity command, the frequency range (frequency band) of the measurement target which is previously identified is compared with the Nyquist frequency $F_n$, and in which thus the multi-sine method is applied in a band where the frequency of the measurement target is equal to or less than the Nyquist frequency $F_n$ whereas the sweep sine method is applied in a band where the frequency of the measurement target is equal to or greater than the Nyquist frequency $F_n$.

Figure 5C:
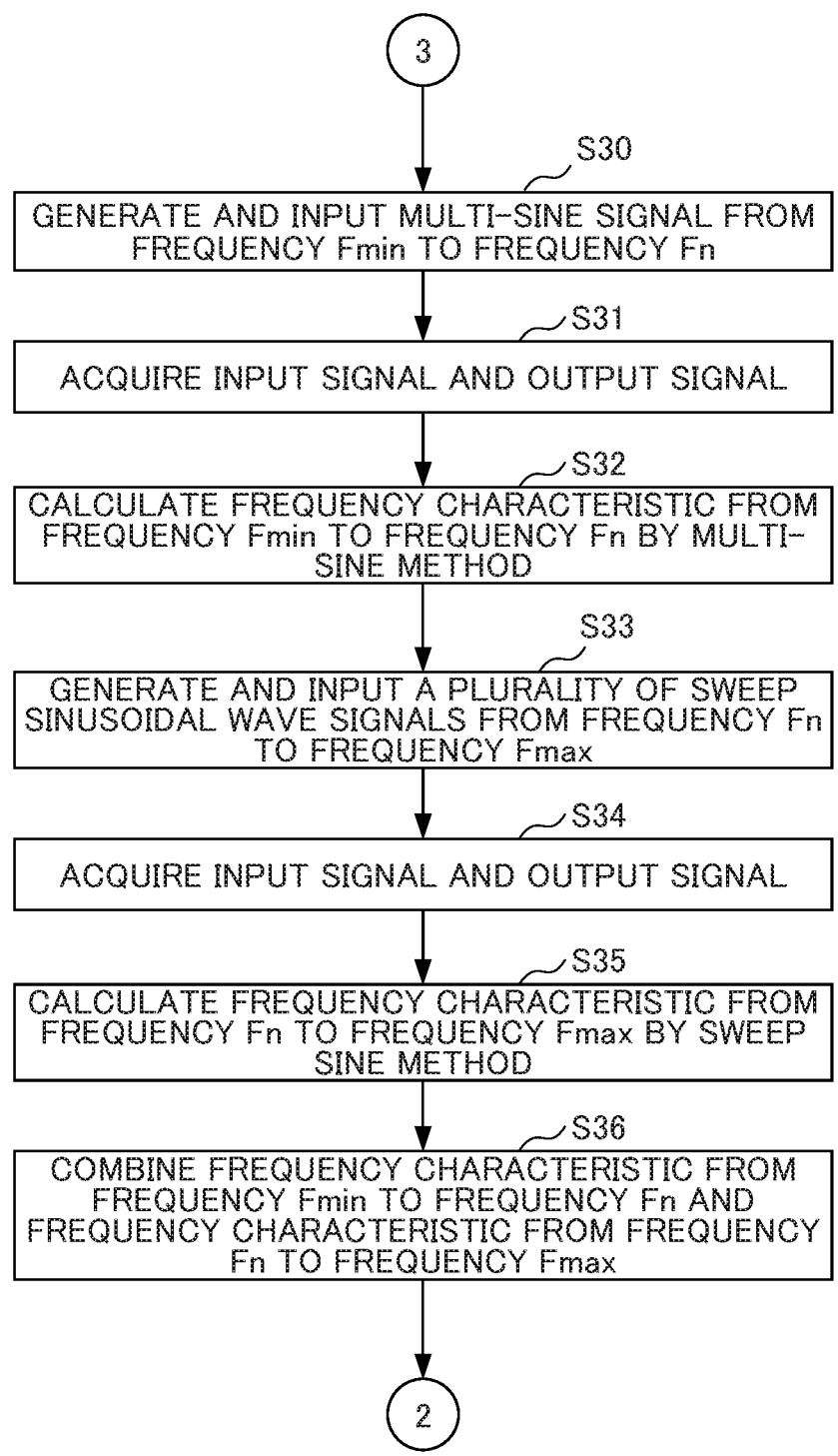
FIG. 5C is a flowchart illustrating the measurement operation of the frequency characteristic measurement unit.

An operation of measuring, with the frequency characteristic measurement unit 200 according to the present embodiment, the frequency characteristic (frequency response characteristic) of the motor to which the load is connected will then be described. FIGS. 5A to 5C are flowcharts illustrating the operation of measuring the frequency characteristic (frequency response characteristic) of the motor to which the load is connected.

With reference to FIG. 5A, in step S10, the frequency characteristic measurement unit 200 calculates the Nyquist frequency $F_n$ based on the sampling frequency $F_s$ for sampling (sampling) the input signal and the output signal.

In step S11, the frequency characteristic measurement unit 200 acquires the setting values of the lower limit frequency $F_{min}$ and the upper limit frequency $F_{max}$ in the frequency range (frequency band) of the measurement target.

In step S12, the frequency characteristic measurement unit 200 compares the Nyquist frequency $F_n$ with the upper limit frequency $F_{max}$ calculated in step S1. Specifically, whether or not $F_{max} \leq F_n$ is satisfied is determined. When it is satisfied that $F_{max} \leq F_n$ (in the case of yes), the process is transferred to step S13. When $F_n < F_{max}$ is satisfied (in the case of no), the process is transferred to step S20.

In step S13, the frequency characteristic measurement unit 200 generates, (with the multi-sine signal generation unit 213), the multi-sine signal formed with the sinusoidal wave of a plurality of frequencies included in the measurement target range, and inputs it to the velocity feedback loop (through the input signal switching unit 215).

In step S14, the frequency characteristic measurement unit 200 (specifically, the data acquisition unit 251) acquires, at the sampling frequency $F_s$, the sampling data of the input signal which is input to the velocity feedback loop and the sampling data of the output signal which is output from the velocity feedback loop.

In step S15, the frequency characteristic measurement unit 200 (specifically, the characteristic calculation unit 252) calculates, by the multi-sine method, the frequency characteristic including the gain and the phase of the input and output signals of the velocity feedback loop in the frequency band of the measurement target and displays the frequency characteristic. The frequency characteristic calculation processing when $F_{max} \leq F_n$ is satisfied has been completed.

Then, with reference to FIG. 5B, in step S20, the frequency characteristic measurement unit 200 compares the Nyquist frequency $F_n$ with the lower limit frequency $F_{min}$ calculated in step S1. Specifically, whether or not $F_n \leq F_{min}$ is satisfied is determined. When $F_n \leq F_{min}$ is satisfied (in the case of yes), the process is transferred to step S21. When $F_n > F_{min}$ (in the case of no), the process is transferred to step S30.

In step S21, the frequency characteristic measurement unit 200 generates, (with the sweep sinusoidal wave generation unit 214), a plurality of sweep sinusoidal waves formed with a sweep sinusoidal wave in which the predetermined phase is set to the initial phase and which is generated while the frequency is being increased from the lower limit frequency $F_{min}$ to the upper limit frequency $F_{max}$ and the sweep sinusoidal wave which is obtained by shifting the initial phase only the fixed amount, and inputs the sweep sinusoidal waves to the velocity feedback loop (through the input signal switching unit 215).

In step S22, the frequency characteristic measurement unit 200 (specifically, the data acquisition unit 251) acquires, at the sampling frequency $F_s$, the sampling data of the input signal which is input to the velocity feedback loop and the sampling data of the output signal which is output from the velocity feedback loop.

In step S23, the frequency characteristic measurement unit 200 (specifically, the characteristic calculation unit 252) calculates, by the sweep sine method, the frequency characteristic including the gain and the phase of the input and output signals of the velocity feedback loop in the frequency band of the measurement target and displays the frequency characteristic. The frequency characteristic calculation processing when $F_n \leq F_{min}$ satisfied has been completed.

Finally, with reference to FIG. 5C, in step S30, the frequency characteristic measurement unit 200 generates, (with the multi-sine signal generation unit 213), the multi-sine signal formed with the sinusoidal waves of a plurality of frequencies from the lower limit frequency $F_{min}$ to the Nyquist frequency $F_n$, and inputs the multi-sine signal to the velocity feedback loop (through the input signal switching unit 215).

In step S31, the frequency characteristic measurement unit 200 (specifically, the data acquisition unit 251) acquires, at the sampling frequency $F_s$, the sampling data of the input signal which is input to the velocity feedback loop and the sampling data of the output signal which is output from the velocity feedback loop.

In step S32, the frequency characteristic measurement unit 200 (specifically, the characteristic calculation unit 252) calculates, by the multi-sine method, the frequency characteristic including the gain and the phase of the input and output signals of the velocity feedback loop in the frequency band from the lower limit frequency $F_{min}$ to the Nyquist frequency $F_n$.

In step S33, the frequency characteristic measurement unit 200 generates, (specifically, with the sweep sinusoidal wave generation unit 214), a plurality of sweep sinusoidal waves formed with a sweep sinusoidal wave in which the predetermined phase is set to the initial phase and which is generated while the frequency is being increased from the Nyquist frequency $F_n$ to the upper limit frequency $F_{max}$ and the sweep sinusoidal wave which is obtained by shifting the initial phase only the fixed amount, and inputs the sweep sinusoidal waves to the velocity feedback loop (through the input signal switching unit 215).

In step S34, the frequency characteristic measurement unit 200 (specifically, the data acquisition unit 251) acquires, at the sampling frequency $F_s$, the sampling data of the input signal which is input to the velocity feedback loop and the sampling data of the output signal which is output from the velocity feedback loop.

In step S35, the frequency characteristic measurement unit 200 (specifically, the characteristic calculation unit 252) calculates, by the sweep sine method, the frequency characteristic including the gain and the phase of the input and output signals of the velocity feedback loop in the frequency band from the Nyquist frequency $F_n$ to the upper limit frequency $F_{max}$.

In step S36, the frequency characteristic measurement unit 200 (specifically, the characteristic calculation unit 252) combines the frequency characteristic in the frequency band from the lower limit frequency $F_{min}$ to the Nyquist frequency $F_n$ calculated in step S32 and the frequency characteristic in the frequency band from the Nyquist frequency $F_n$ to the upper limit frequency $F_{max}$ calculated in step S35, calculates the frequency characteristic in the frequency range of the measurement target and displays the frequency characteristic. The frequency characteristic calculation processing when $F_{min} < F_n < F_{max}$ is satisfied has been completed.

In the frequency characteristic measurement unit 200 of the present embodiment, when the frequency characteristic in the low frequency band (specifically, the band equal to or less than the Nyquist frequency) is measured, the method in which the measurement can be performed for a short period of time and in which the multi-sine signal is input is adopted whereas when the frequency characteristic in the high frequency band (specifically, the band equal to or greater than the Nyquist frequency) is measured, the method in which a plurality of sweep sinusoidal waves are input is adopted. In this way, it is possible to provide high measurement accuracy and to reduce a measurement time regardless of the value in a frequency band which is measured.

The individual constituent units included in the controller described above can be realized by hardware (including an electronic circuit and the like), software or a combination thereof. The servo control method which is performed by the coordination of the individual constituent units included in the controller described above can also be realized by hardware, software or a combination thereof. Here, the realization by software means that a computer reads and performs programs so as to achieve the realization. When the configuration is achieved by hardware, part or the whole of the functions of the individual constituent units included in the controller described above can be formed with an integrated circuit (IC) such as an ASIC (Application Specific Integrated Circuit), a gate array, an FPGA (Field Programmable Gate Array) or a CPLD (Complex Programmable Logic Device).

Programs are stored with various types of non-transitory computer readable media, and can be supplied to a computer. The non-transitory computer readable media include various types of tangible recording media (tangible storage media). Examples of the non-transitory computer readable medium include a magnetic recording medium (for example, a hard disk drive), a magneto-optical recording medium (for example, a magneto-optical disk), a CD-ROM (Read Only Memory), a CD-R, a CD-R/W and semiconductor memories (for example, a mask ROM, a PROM (Programmable ROM), an EPROM (Erasable PROM), a flash ROM and a RAM (random access memory). The programs may be supplied to the computer with various types of transitory computer readable media.

Although the embodiment has been described above, the frequency characteristic measurement unit 200 is not limited to the embodiment described above, and variations, modifications and the like are included as long as the object can be achieved.

<Variation 1>

Figure 6:
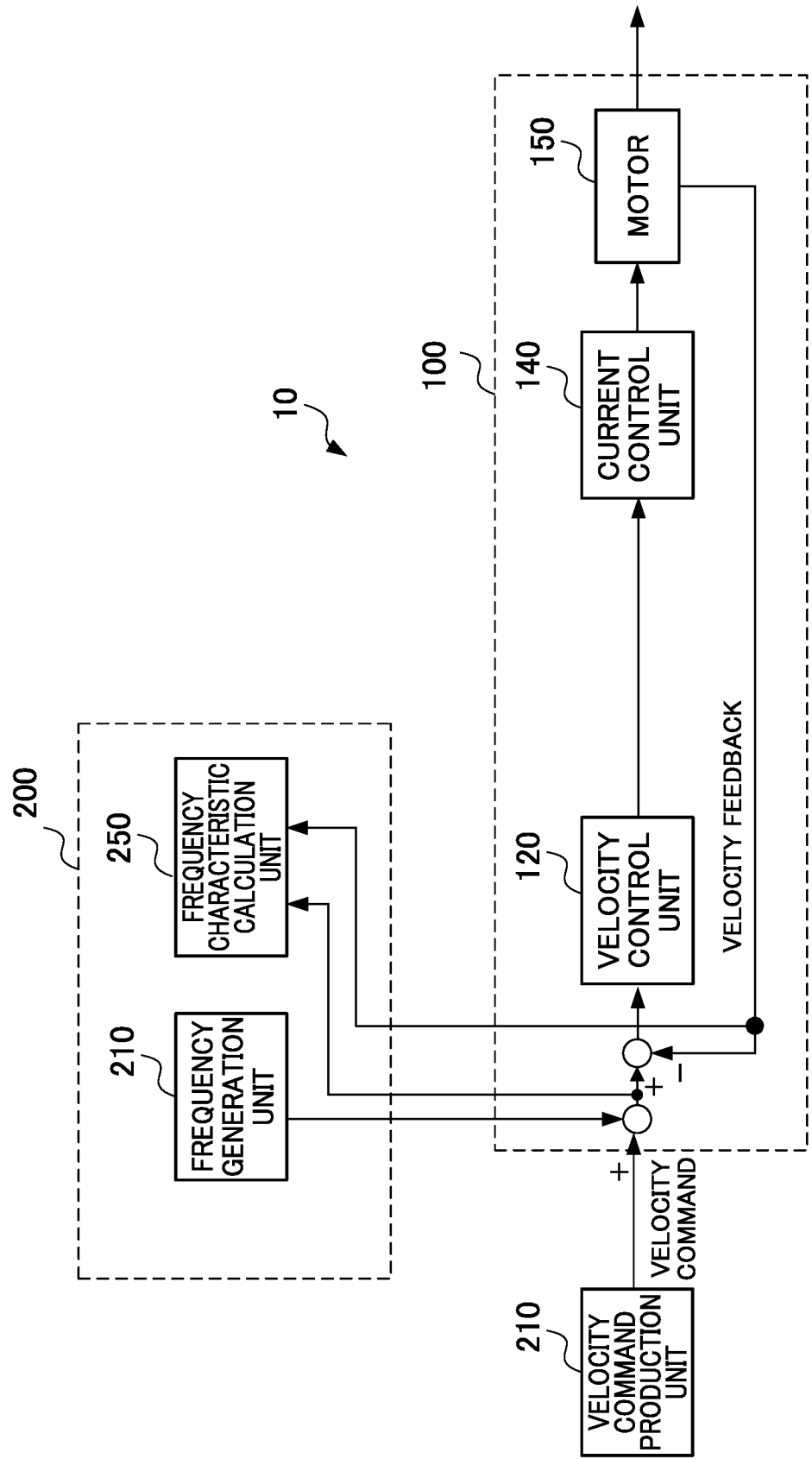
FIG. 6 is a diagram showing an example of the configuration of a controller according to an embodiment.

Although in the embodiment described above, the motor to which the load is connected in the controller is used as the example, and the case where the frequency characteristic (frequency response) of the control signal (velocity command) is measured is illustrated, the frequency measurement target of the frequency characteristic measurement unit is not limited to this example. For example, as shown in FIG. 6, a frequency response when a sinusoidal disturbance generated with the frequency generation unit 210 is input to a velocity command value produced with a velocity command production unit may be measured. In this way, it is possible to adjust, for example, a velocity control gain.

<Variation 2>

Although in the embodiment described above, the motor to which the load is connected is used as the example of one control target, and the case where the frequency characteristic (frequency response characteristic) of the velocity command is measured is illustrated, the frequency measurement target of the frequency characteristic measurement unit is not limited to the velocity command. An arbitrary control target may be used as the measurement target, and thus the frequency characteristic (frequency response characteristic) of the input signal may be measured. An input signal (for example, a torque command) other than the velocity command may be used as the measurement target, and thus the frequency characteristic (frequency response characteristic) of the input signal may be measured.

<Variation 3>

Although in the embodiment described above, the controller 10 includes the frequency characteristic measurement unit 200, there is no limitation to this configuration. For example, the frequency characteristic measurement unit 200 may be provided as an independent frequency characteristic measurement device or may be one device. The frequency characteristic measurement unit 200 may be provided within the servo control unit 100. One of the frequency generation unit 210 and the frequency characteristic calculation unit 250 forming the frequency characteristic measurement unit 200 may be provided within the controller 10 or the servo control unit 100. It may be provided as an independent device or may be one device.

In other words, the controller of the present disclosure can adopt various types of embodiments which have the following configurations.

(1) One aspect of the frequency characteristic measurement unit 200 serving as the frequency characteristic measurement device of the present disclosure is a frequency characteristic measurement unit 200 that supplies a sinusoidal signal to a measurement target so as to measure the frequency characteristic of the measurement target, and the frequency characteristic measurement unit 200 includes: a multi-sine signal generation unit 213 that generates a multi-sine signal formed with sinusoidal waves of a plurality of frequencies; a sweep sinusoidal wave generation unit 214 that generates a sweep sinusoidal wave while increasing a frequency and that generates a plurality of sweep sinusoidal waves formed with a sweep sinusoidal wave in which a predetermined phase is set to an initial phase and a sweep sinusoidal wave which is obtained by shifting the initial phase only a fixed amount; an input signal switching unit 215 that selects any one of the multi-sine signal generated with the multi-sine signal generation unit and the sweep sinusoidal waves generated with the sweep sinusoidal wave generation unit 214 so as to input the selected one to a control loop of a control target serving as the measurement target; a data acquisition unit 251 that acquires, at a predetermined sampling frequency, sampling data of an input signal which is input to the control loop and sampling data of an output signal which is output from the control loop; and a characteristic calculation unit 252 that calculates a frequency characteristic including the gain and the phase of the input and output signals in the control loop from the sampling data of the input signal and the sampling data of the output signal acquired with the data acquisition unit 251.

In the frequency characteristic measurement unit 200, when the frequency characteristic in the low frequency band is measured, the method in which the measurement can be performed for a short period of time and in which the multi-sine signal is input can be adopted whereas when the frequency characteristic in the high frequency band is measured, the method in which a plurality of sweep sinusoidal waves are input can be adopted. In this way, it is possible to provide high measurement accuracy and to reduce a measurement time.

(2) Preferably, in the frequency characteristic measurement unit 200 serving as the frequency characteristic measurement device of (1), the sweep sinusoidal wave generation unit 214 generates n sweep sinusoidal waves obtained by shifting the initial phase by $2\pi/n$.

(3) Preferably, in the frequency characteristic measurement unit 200 serving as the frequency characteristic measurement device of (2), the sweep sinusoidal wave generation unit 214 generates a sweep sinusoidal wave obtained by shifting the initial phase by $2\pi/3$ and a sweep sinusoidal wave obtained by shifting the initial phase by $-2\pi/3$.

(4) Preferably, the frequency characteristic measurement unit 200 serving as the frequency characteristic measurement device of (1) to (3) includes: a Nyquist frequency calculation unit 211 that calculates a Nyquist frequency from the sampling frequency; and a frequency band acquisition unit 212 that acquires a lower limit frequency and an upper limit frequency in frequencies whose frequency characteristic is calculated with the characteristic calculation unit 252, when the Nyquist frequency is equal to or greater than the upper limit frequency, the input signal switching unit 215 inputs, to the control loop serving as the measurement target, a multi-sine signal generated with the multi-sine signal generation unit 213 and formed with sinusoidal waves of a plurality of frequencies from the lower limit frequency to the upper limit frequency, when the Nyquist frequency is equal to or less than the lower limit frequency, the input signal switching unit 215 inputs, to the control loop, a plurality of sweep sinusoidal waves generated with the sweep sinusoidal wave generation unit 214 and formed with a sweep sinusoidal wave in which the predetermined phase is set to the initial phase and which is generated while the frequency is being increased from the lower limit frequency to the upper limit frequency and the sweep sinusoidal wave which is obtained by shifting the initial phase only the fixed amount and when the Nyquist frequency is greater than the lower limit frequency and is less than the upper limit frequency, the input signal switching unit 215 inputs, to the control loop, a multi-sine signal generated with the multi-sine signal generation unit 213 and formed with sinusoidal waves of a plurality of frequencies from the lower limit frequency to the Nyquist frequency, and the input signal switching unit 215 inputs, to the control loop, a plurality of sweep sinusoidal waves generated with the sweep sinusoidal wave generation unit 214 and formed with a sweep sinusoidal wave in which the predetermined phase is set to the initial phase and which is generated while the frequency is being increased from the Nyquist frequency to the upper limit frequency and the sweep sinusoidal wave which is obtained by shifting the initial phase only the fixed amount.

In the frequency characteristic measurement unit 200, when the frequency characteristic in the band equal to or less than the Nyquist frequency is measured, the method in which the measurement can be performed for a short period of time and in which the multi-sine signal is input can be adopted whereas when the frequency characteristic in the band equal to or greater than the Nyquist frequency is measured, the method in which a plurality of sweep sinusoidal waves are input can be adopted. In this way, it is possible to provide high measurement accuracy and to reduce a measurement time regardless of the value in a frequency band which is measured.

(5) Preferably, one aspect of the controller 10 of the present disclosure includes the frequency characteristic measurement unit 200 described in any one of (1) to (4). In this way, the controller 10 can achieve the same effects as in (1) to (4).

(6) One aspect of the frequency characteristic measurement method of the present disclosure is a frequency characteristic measurement method that supplies a sinusoidal signal to a measurement target so as to measure the frequency characteristic of the measurement target, the frequency characteristic measurement method includes: a multi-sine signal generation step of generating a multi-sine signal formed with sinusoidal waves of a plurality of frequencies; a sweep sinusoidal wave generation step of generating a sweep sinusoidal wave while increasing a frequency and of generating a plurality of sweep sinusoidal waves formed with a sweep sinusoidal wave in which a predetermined phase is set to an initial phase and a sweep sinusoidal wave which is obtained by shifting the initial phase only a fixed amount; an input signal switching step of selecting any one of the multi-sine signal generated in the multi-sine signal generation step and the sweep sinusoidal waves generated in the sweep sinusoidal wave generation step so as to input the selected one to the measurement target; a data acquisition step of acquiring, at a predetermined sampling frequency, sampling data of an input signal which is input to the measurement target and sampling data of an output signal which is output from the measurement target; and a characteristic calculation step of calculating a frequency characteristic including the gain and the phase of the input and output signals in the measurement target from the sampling data of the input signal and the sampling data of the output signal acquired in the data acquisition step and the multi-sine signal generation step, the sweep sinusoidal wave generation step, the input signal switching step, the data acquisition step and the characteristic calculation step are performed with a computer. In this way, the frequency characteristic measurement method can achieve the same effects as those of the frequency characteristic measurement device of (1).

EXPLANATION OF REFERENCE NUMERALS

10 controller
100 servo control unit 110 subtractor
120 velocity control unit
130 filter
140 current control unit
150 servo motor
200 frequency characteristic measurement unit
210 frequency generation unit
211 Nyquist frequency calculation unit
212 frequency band acquisition unit
213 multi-sine signal generation unit
214 sweep sinusoidal wave generation unit
215 input signal switching unit
250 frequency characteristic calculation unit
251 data acquisition unit
252 characteristic calculation unit
253 characteristic display unit

What is claimed is:

1. A frequency characteristic measurement device that supplies a sinusoidal signal to a measurement target so as to measure a frequency characteristic of the measurement target, the frequency characteristic measurement device comprising:
a multi-sine signal generation unit that generates a multi-sine signal formed with sinusoidal waves of a plurality of frequencies;
a sweep sinusoidal wave generation unit that generates a sweep sinusoidal wave while increasing a frequency and that generates a plurality of sweep sinusoidal waves formed with a sweep sinusoidal wave in which a predetermined phase is set to an initial phase and a sweep sinusoidal wave which is obtained by shifting the initial phase only a fixed amount;
an input signal switching unit that selects the multi-sine signal generated with the multi-sine signal generation unit in a case where the frequency is lower than a predetermined frequency that is set in advance and selects the sweep sinusoidal waves generated with the sweep sinusoidal wave generation unit in a case where the frequency is higher than the predetermined frequency so as to input the selected one of the multi-sine signal or the sweep sinusoidal waves to the measurement target;
a data acquisition unit that acquires, at a predetermined sampling frequency, sampling data of an input signal which is input to the measurement target and sampling data of an output signal which is output from the measurement target; and
a characteristic calculation unit that calculates a frequency characteristic including a gain and a phase of the input and output signals in the measurement target from the sampling data of the input signal and the sampling data of the output signal acquired with the data acquisition unit.

2. The frequency characteristic measurement device according to claim 1, wherein the sweep sinusoidal wave generation unit generates n sweep sinusoidal waves obtained by shifting the initial phase by $2\pi/n$, where n is a natural number equal to or greater than 2.

3. The frequency characteristic measurement device according to claim 2, wherein the sweep sinusoidal wave generation unit generates a sweep sinusoidal wave obtained by shifting the initial phase by $2\pi/3$ and a sweep sinusoidal wave obtained by shifting the initial phase by $-2\pi/3$.

4. The frequency characteristic measurement device according to claim 1, comprising:
a Nyquist frequency calculation unit that calculates a Nyquist frequency from the sampling frequency; and
a frequency band acquisition unit that acquires a lower limit frequency and an upper limit frequency in a frequency band of the measurement target whose frequency characteristic is calculated with the characteristic calculation unit,
wherein the Nyquist frequency is set as the predetermined frequency, and
wherein when the Nyquist frequency is equal to or greater than the upper limit frequency, the input signal switching unit inputs, to the measurement target, a multi-sine signal generated with the multi-sine signal generation unit and formed with sinusoidal waves of a plurality of frequencies from the lower limit frequency to the upper limit frequency, when the Nyquist frequency is equal to or less than the lower limit frequency, the input signal switching unit inputs, to the measurement target, a plurality of sweep sinusoidal waves generated with the sweep sinusoidal wave generation unit and formed with a sweep sinusoidal wave in which the predetermined phase is set to the initial phase and which is generated while the frequency is being increased from the lower limit frequency to the upper limit frequency and the sweep sinusoidal wave which is obtained by shifting the initial phase only the fixed amount and when the Nyquist frequency is greater than the lower limit frequency and is less than the upper limit frequency, the input signal switching unit inputs, to the measurement target, a multi-sine signal generated with the multi-sine signal generation unit and formed with sinusoidal waves of a plurality of frequencies from the lower limit frequency to the Nyquist frequency, and inputs, to the measurement target, a plurality of sweep sinusoidal waves generated with the sweep sinusoidal wave generation unit and formed with a sweep sinusoidal wave in which the predetermined phase is set to the initial phase and which is generated while the frequency is being increased from the Nyquist frequency to the upper limit frequency and the sweep sinusoidal wave which is obtained by shifting the initial phase only the fixed amount.

5. The frequency characteristic measurement device according to claim 1, wherein the measurement target is a control loop that controls at least one control target in a controller.

6. A controller comprising: the frequency characteristic measurement device according to claim 1.

7. A frequency characteristic measurement method that supplies a sinusoidal signal to a measurement target so as to measure a frequency characteristic of the measurement target, the frequency characteristic measurement method comprising:
a multi-sine signal generation step of generating a multi-sine signal formed with sinusoidal waves of a plurality of frequencies;
a sweep sinusoidal wave generation step of generating a sweep sinusoidal wave while increasing a frequency and of generating a plurality of sweep sinusoidal waves formed with a sweep sinusoidal wave in which a predetermined phase is set to an initial phase and a sweep sinusoidal wave which is obtained by shifting the initial phase only a fixed amount;
an input signal switching step of selecting the multi-sine signal generated in the multi-sine signal generation step in a case where the frequency is lower than a predetermined frequency that is set in advance and selecting the sweep sinusoidal waves generated in the sweep sinusoidal wave generation step in a case where the frequency is higher than the predetermined frequency so as to input the selected one of the multi-sine signal or the sweep sinusoidal waves to the measurement target;

a data acquisition step of acquiring, at a predetermined sampling frequency, sampling data of an input signal which is input to the measurement target and sampling data of an output signal which is output from the measurement target; and a characteristic calculation step of calculating a frequency characteristic including a gain and a phase of the input and output signals in the measurement target from the sampling data of the input signal and the sampling data of the output signal acquired in the data acquisition step, wherein the multi-sine signal generation step, the sweep sinusoidal wave generation step, the input signal switching step, the data acquisition step and the characteristic calculation step are performed with a computer.

* * * * *